(12) United States Patent
Subrahmanyam et al.

(10) Patent No.: US 8,577,829 B2
(45) Date of Patent: Nov. 5, 2013

(54) EXTRACTING INFORMATION FROM UNSTRUCTURED DATA AND MAPPING THE INFORMATION TO A STRUCTURED SCHEMA USING THE NAÏVE BAYESIAN PROBABILITY MODEL

(75) Inventors: Rajiv Subrahmanyam, Mountain View, CA (US); Hector Aguilar-Macias, Sunnyvale, CA (US)

(73) Assignee: Hewlett-Packard Development Company, L.P., Houston, TN (US)

( * ) Notice: Subject to any disclaimer, the term of this patent is extended or adjusted under 35 U.S.C. 154(b) by 496 days.

(21) Appl. No.: 12/881,036

(22) Filed: Sep. 13, 2010

(65) Prior Publication Data

US 2011/0066585 A1    Mar. 17, 2011

Related U.S. Application Data

(60) Provisional application No. 61/241,518, filed on Sep. 11, 2009.

(51) Int. Cl.
*G06F 17/21* (2006.01)
*G06F 17/40* (2006.01)

(52) U.S. Cl.
USPC ............................................. 706/52; 706/20

(58) Field of Classification Search
USPC ......................................................... 706/52
See application file for complete search history.

(56) References Cited

U.S. PATENT DOCUMENTS

| | | |
|---|---|---|
| 7,293,287 B2 | 11/2007 | Fischman et al. |
| 7,478,102 B2 | 1/2009 | Ellis et al. |
| 2006/0195459 A1 | 8/2006 | Nori et al. |
| 2007/0055655 A1 | 3/2007 | Bernstein et al. |
| 2008/0027930 A1 | 1/2008 | Bohannon et al. |
| 2010/0306285 A1 | 12/2010 | Shah et al. |

OTHER PUBLICATIONS

Nigam et al. (Nigam00), Text Classification from Labeled and Unlabeled Documents using EM [online], 2000 [retrieved on Jan. 17, 2013]. Retrieved from the Internet:<URL:http://link.springer.com/content/pdf/10.1023%2FA%3A1007692713085>.*
PCT International Search Report and Written Opinion, PCT Application No. PCT/US2010/048641, Nov. 2, 2010, six pages.
U.S. Appl. No. 10/308,941, filed Dec. 2, 2002 (copy not enclosed).
Wikipedia, "Naive Bayes Classifier," Mar. 4, 2011, twelve pages. [Online] [Retrieved Mar. 5, 2011] Retrieved from the Internet <URL: http://en.wikipedia.org/wiki/Naive_Bayes_classifier>.

(Continued)

*Primary Examiner* — Jeffrey A Gaffin
*Assistant Examiner* — Nathan Brown, Jr.

(57) ABSTRACT

An "unstructured event parser" analyzes an event that is in unstructured form and generates an event that is in structured form. A mapping phase determines, for a given event token, possible fields of the structured event schema to which the token could be mapped and the probabilities that the token should be mapped to those fields. Particular tokens are then mapped to particular fields of the structured event schema. By using the Naïve Bayesian probability model, a "probabilistic mapper" determines, for a particular token and a particular field, the probability that that token maps to that field. The probabilistic mapper can also be used in a "regular expression creator" that generates a regex that matches an unstructured event and a "parameter file creator" that helps a user create a parameter file for use with a parameterized normalized event generator to generate a normalized event based on an unstructured event.

15 Claims, 8 Drawing Sheets

(56) References Cited

OTHER PUBLICATIONS

Wikipedia, "Part-of-Speech Tagging," Feb. 23, 2011, seven pages. [Online] [Retrieved Mar. 5, 2011] Retrieved from the Internet <URL: http://en.wikipedia.org/wiki/Part_of_speech_tagging>.

Wikipedia, "Word Sense Disambiguation," Feb. 21, 2011, nineteen pages. [Online] [Retrieved Mar. 5, 2011] Retrieved from the Internet <URL: http://en.wikipedia.org/wiki/Word_sense_disambiguation>.

Yuret, D. et al., "Some Experiments with a Naive Bayes WSD System," SENSEVAL-3: Third International Workshop on the Evaluation of Systems for the Semantic Analysis of Text, Association for Computational Linguistics, Jul. 2004, Barcelona, Spain, four pages. [Online] [Retrieved Mar. 5, 2011] Retrieved from the Internet <URL: http://aclweb.org/anthology-new/W/W04/W04-0864.pdf>.

* cited by examiner

FIG. 8

Wizard

Enter regular expression corresponding to text

Text: 10.0.180.192 - - [17/Mar/2002:08:10:05 -0800] "GET /scripts/root.exe?/c+dir HTTP/1.0" 404 288 "-" "-"

Regex: (\d+\.\d+\.\d+\.\d+) - (\S+?) - \[17/Mar/2002:08:10:05 -06\] "((\d+\.\S+/\d+\.\d+.\d+ \S+?)) "(\S+?) (\S+?)" (\d+) (\d+) "(\S+?)" "(\S+?)"

[Recalculate] [Reset]

| Value from Sample | Type | Format | Event Field |
|---|---|---|---|
| 10.0.185.192 | IPAddress | String | sourceAddress |
| - | String | String | sourceUserName |
| 17/Mar/2002:08:10:05 -06 | TimeStamp | dd/MMM/yyyy:HH:mm:ss z | endTime |
| GET | String | String | requestMethod |
| /scripts/root.exe?/c+dir | String | String | requestUrl |
| HTTP/1.0 | String | String | applicationProtocol |
| 404 | Integer | String | deviceEventClassId |
| 288 | Integer | String | bytesOut |
| - | String | String | deviceSeverity |
| - | String | String | destinationUserName |

EXTRACTING INFORMATION FROM UNSTRUCTURED DATA AND MAPPING THE INFORMATION TO A STRUCTURED SCHEMA USING THE NAÏVE BAYESIAN PROBABILITY MODEL

CROSS-REFERENCE TO RELATED APPLICATIONS

This application claims priority from U.S. provisional application No. 61/241,518, filed Sep. 11, 2009, entitled "Extracting Information from Unstructured Data and Mapping the Information to a Structured Schema Using the Naïve Bayesian Probability Model" and is related to U.S. application Ser. No. 10/308,941, filed Dec. 2, 2002, entitled "Event Normalization with Software Agent of Network Security System", both of which are incorporated by reference herein in their entirety.

BACKGROUND

1. Field of Art

This application generally relates to extracting information from unstructured data. More particularly, it relates to extracting information from unstructured data and mapping the information to a structured schema using the Naïve Bayesian Probability Model.

2. Description of the Related Art

Log data can be generated by various sources, including both devices and applications. These sources can be, for example, intrusion detection systems (IDSs), intrusion prevention systems (IPSs), vulnerability assessment tools, firewalls, anti-virus tools, anti-spam tools, encryption tools, application audit logs, and physical security logs. Log data is comprised of one or more data instances called "events." An event can be, for example, an entry in a log file, an entry in a syslog server, an alert, an alarm, a network packet, an email, or a notification page.

In general, an event represents a data structure that includes one or more fields, where each field can contain a value. An event can be in any format. However, before the event can be effectively analyzed and used for reporting, correlation, etc., it needs to be normalized into a structured format or schema. This normalization is achieved by using a parser that can interpret the semantics (meaning) of an event. The parser maps event information to the appropriate fields in the structured representation of the event. The mapping operation uses knowledge about the format of an event and is specified at the time of development of the parser. As a result, the parser is deterministic. When the format of an event is not known beforehand (or when an event includes free-form plain text), this deterministic approach cannot be used.

SUMMARY

Log data is comprised of one or more data instances called "events." An event can be, for example, an entry in a log file, an entry in a syslog server, an alert, an alarm, a network packet, an email, or a notification page. In general, an event represents a data structure that includes one or more fields, where each field can contain a value. An event can be in any format, including free-form plain text. However, before the event can be effectively analyzed and used for reporting, correlation, etc., it needs to be normalized into a structured format or schema.

When the format of an event is not known beforehand or when an event includes free-form plain text, the event is referred to as being in "unstructured form". It is difficult to automatically extract information from an unstructured event and map the information to a structured schema. In one embodiment, this normalization is achieved by using an "unstructured event parser." An unstructured event parser analyzes an event that is in unstructured form and generates an event that is in structured form. The event analysis includes three phases: tokenization, information capture, and mapping. The mapping phase determines, for a given token, possible fields of the structured event schema to which the token could be mapped and the probabilities that the token should be mapped to those fields ("field mapping probabilities"). This information can then be used to map particular tokens to particular fields of the structured event schema. In other words, a token is "classified" according to a particular field. This field mapping is then used to generate a structured (normalized) event.

In one embodiment, an unstructured event parser includes a "probabilistic mapper" that determines, for a particular token and a particular field, the probability that that token maps to that field (referred to as a "field mapping probability"). The probabilistic mapper determines this probability according to the Naïve Bayesian probability model. Thus, the probabilistic mapper operates non-deterministically (i.e., based on probabilities rather than certainties). The premise is that unfamiliar unstructured events share many similarities with events that have been parsed in the past. By examining how tokens of past events were mapped, an educated guess can be made as to how the unfamiliar tokens should be mapped. Given the features associated with a token, the probabilistic mapper calculates the probability of the token mapping to a particular field according to the Naïve Bayesian probability model.

In one embodiment, an unstructured event parser operates as follows: For each token produced by a tokenizer, the probabilistic mapper calculates the probability of the token mapping to each field in the structured event schema. The calculation uses field mapping statistics. The results are ordered by descending probability. If the maximum probability falls below a threshold, then the probabilistic mapper decides not to map the token to any field. Otherwise, the calculated fields are ordered by descending probability, and the token is mapped to the most likely field.

The probabilistic mapper can be used in other ways. Manually authoring a regular expression ("regex") can be difficult. In one embodiment, a "regex creator" receives an event that is in unstructured form and outputs a regular expression that matches and/or extracts token values from the event. This regex creator uses the probabilistic mapper.

In one embodiment, a regular expression creator operates as follows: The regex is built incrementally. For each token in the unstructured event, a determination is made regarding whether the token should be treated as a variable or as a literal. If the token should be treated as a variable, then an appropriate regex is obtained from a Type regex table based on the token's Type. The appropriate regex is appended to the contents of the regex. (If the token value is to be extracted, and not merely matched, then the appropriate regex is surrounded by parentheses before adding it to the regex.) If the token should be treated as a literal, then the Value of the token is appended to the contents of the regex. After all of the tokens have been processed, the content of the regex is returned.

The probabilistic mapper can also be used in other ways. Consider a "normalized event generator" that takes as input an unstructured event, applies a regular expression to the event to extract token values, maps the token values to a schema, and outputs an event that adheres to the schema (a "normalized event"). In one embodiment, a normalized event generator is parameterized so that the regular expression and the token mappings are stored in a "parameter file" that exists separately from the rest of the normalized event generator. Manually authoring a parameter file can be difficult. In one embodiment, a "parameter file creator" helps a user create a parameter file. The parameter file creator receives an unstructured event, determines a regular expression that extracts token values from the unstructured event, determines mappings from the extracted tokens to the fields of a schema, receives user input that customizes the regular expression and/or the mappings, and outputs a parameter file. That parameter file can then be used with a parameterized normalized event generator to generate a normalized event based on an unstructured event. This parameter file creator uses the probabilistic mapper.

In one embodiment, a parameter file creator operates as follows: The parameter file is built incrementally. For each token in the unstructured event, a determination is made regarding whether the token should be treated as a variable or as a literal. If the token should be treated as a variable, then an appropriate regex is obtained from the Type regex table based on the token's Type. The appropriate regex is appended to the regex within the parameter file. (Since the token value is to be extracted, and not merely matched, the appropriate regex is surrounded by parentheses before appending it to the regex within the parameter file.) Suggested field mappings for that token (i.e., within the normalized schema) are stored. If the token should be treated as a literal, then the Value of the token is appended to the regex within the parameter file.

After all of the tokens have been processed, the user is presented with a "suggested parse" that reflects a) the regular expression in the current parameter file (which was automatically generated) and b) the stored suggested field mappings. At that point, the user can modify the suggested parse by selecting, from among the stored suggested field mappings, one field mapping for each token that was treated as a variable. The user can also modify the regex that was automatically generated. For example, the user can change a literal to a variable or vice versa. The modified regex can then be applied to the unstructured event in order to extract token values and determine field mappings. After the user is satisfied, the selected token mappings are added to the parameter file.

BRIEF DESCRIPTION OF DRAWINGS

FIG. 8 is a screenshot of a graphical user interface for generating a parameter file to be used with a parameterized normalized event generator to generate a normalized event based on an unstructured event, according to one embodiment of the invention.

DETAILED DESCRIPTION

Figure 1:
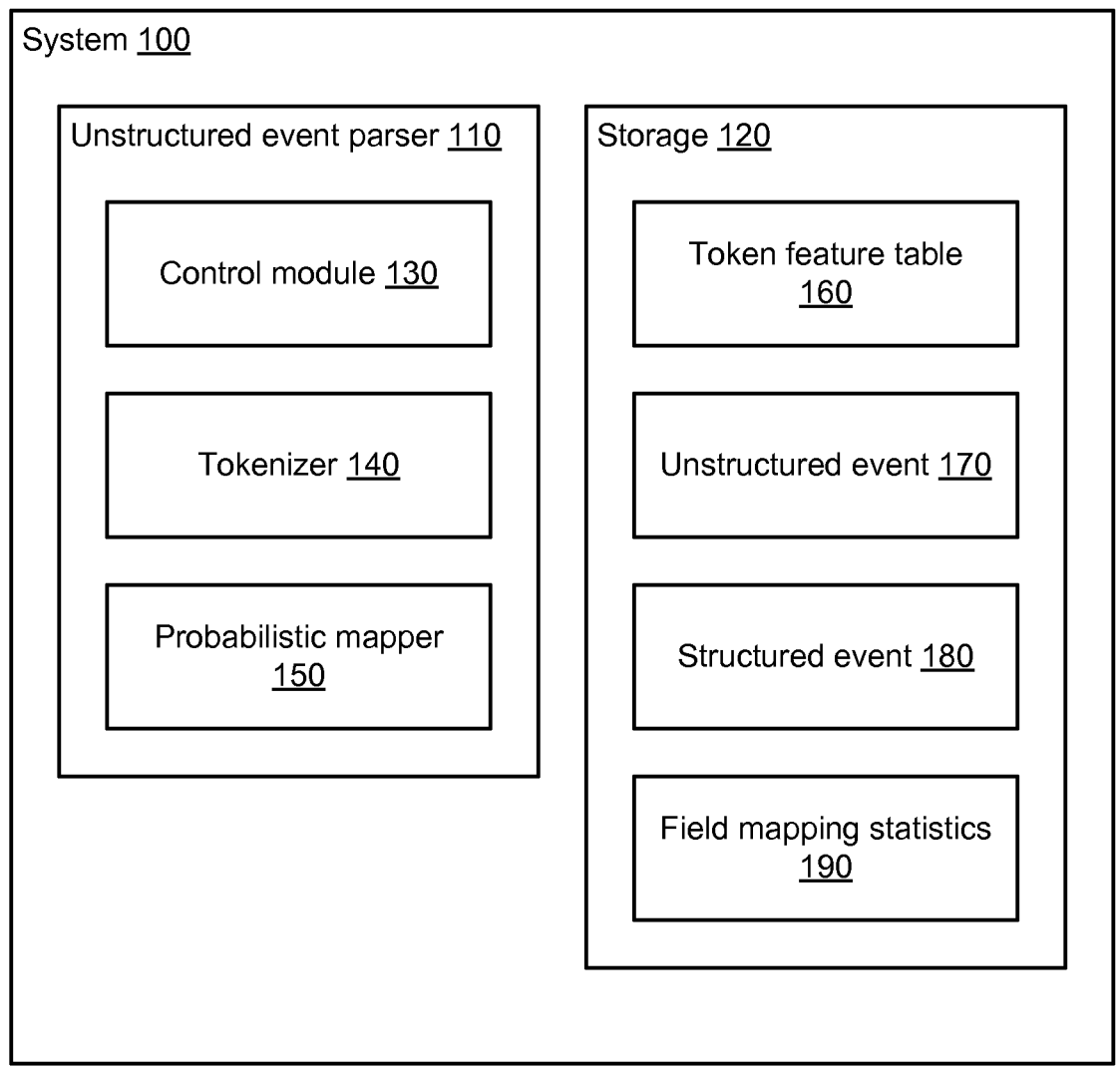
FIG. 1 is a block diagram of a system for analyzing an event that is in unstructured form and generating an event that is in structured form, according to one embodiment of the invention.

The features and advantages described in the specification are not all inclusive and, in particular, many additional features and advantages will be apparent to one of ordinary skill in the art in view of the drawings, specification, and claims. The language used in the specification has been principally selected for readability and instructional purposes and may not have been selected to delineate or circumscribe the disclosed subject matter.

The figures and the following description relate to embodiments of the invention by way of illustration only. Alternative embodiments of the structures and methods disclosed here may be employed without departing from the principles of what is claimed.

Reference will now be made in detail to several embodiments, examples of which are illustrated in the accompanying figures. Wherever practicable, similar or like reference numbers may be used in the figures and may indicate similar or like functionality. The figures depict embodiments of the disclosed systems (or methods) for purposes of illustration only. One skilled in the art will readily recognize from the following description that alternative embodiments of the structures and methods illustrated herein may be employed without departing from the principles described herein.

Log data can be generated by various sources, including both devices and applications. These sources can be, for example, security detection and proxy systems, access and policy controls, core service logs and log consolidators, physical security systems, network hardware, and encryption devices. Security detection and proxy systems include, for example, host-based intrusion detection systems (IDSs), network-based IDSs or intrusion prevention systems (IPSs), multipurpose security appliances, vulnerability management systems, anti-virus systems, honeypots, threat response technology, and network monitoring systems. Access and policy controls include, for example, access and identity management systems, virtual private networks (VPNs), caching engines, firewalls, and security policy management systems.

Core service logs and log consolidators include, for example, operating system logs, database audit logs, application logs, log consolidators, web server logs, and management consoles. Physical security systems include, for example, card key readers, biometrics, burglar alarms, and fire alarms. Network hardware includes, for example, routers and switches. Encryption devices include, for example, data security devices and data integrity devices.

Log data is comprised of one or more data instances called "events." An event can be, for example, an entry in a log file, an entry in a syslog server, an alert, an alarm, a network packet, an email, or a notification page.

In general, an event represents a data structure that includes one or more fields, where each field can contain a value. An event can be in any format, including free-form plain text. However, before the event can be effectively analyzed and used for reporting, correlation, etc., it needs to be normalized into a structured format or schema. One such structured format or schema is the Common Event Format (CEF) log management standard from ArcSight, Inc. of Cupertino, Calif., described in Common Event Format, Revision 15, dated Jul. 17, 2009. Another such format is the Intrusion Detection Message Exchange Format (IDMEF) described in Internet Engineering Task Force (IETF) Request for Comments (RFC) 4765, dated March 2007.

When the format of an event is not known beforehand or when an event includes free-form plain text, the event is referred to as being in "unstructured form". It is difficult to automatically extract information from an unstructured event and map the information to a structured schema. In one embodiment, this normalization is achieved by using an "unstructured event parser." An unstructured event parser analyzes an event that is in unstructured form and generates an event that is in structured form. In one embodiment, an unstructured event parser is used as a fail-over when existing deterministic parsers are unable to process an event (e.g., in real-time). (Since the format of the event is not known, the event is referred to as "unstructured".)

The event analysis includes three phases: tokenization, information capture, and mapping. The mapping phase determines, for a given token, possible fields of the structured event schema to which the token could be mapped and the probabilities that the token should be mapped to those fields ("field mapping probabilities"). This information can then be used to map particular tokens to particular fields of the structured event schema. In other words, a token is "classified" according to a particular field. This field mapping is then used to generate a structured (normalized) event.

FIG. 1 is a block diagram of a system for analyzing an event that is in unstructured form and generating an event that is in structured form, according to one embodiment of the invention. The system 100 is able to generate a structured (normalized) event based on an unstructured event. The structured event is generated automatically, without manual input or interaction. The illustrated system 100 includes an unstructured event parser 110 and storage 120.

In one embodiment, the unstructured event parser 110 (and its component modules) is one or more computer program modules stored on one or more computer readable storage mediums and executing on one or more processors. The storage 120 (and its contents) is stored on one or more computer readable storage mediums. Additionally, the unstructured event parser 110 (and its component modules) and the storage 120 are communicatively coupled to one another to at least the extent that data can be passed between them.

The unstructured event parser 110 includes multiple modules, such as a control module 130, a tokenizer 140, and a probabilistic mapper 150. The control module 130 controls the operation of the unstructured event parser 110 (i.e., its various modules) so that the unstructured event parser 110 can generate a structured (normalized) event based on an unstructured event. The operation of control module 130 will be discussed below with reference to FIG. 3.

The tokenizer 140 splits an unstructured event into tokens based on a set of delimiters and a trimming policy (referred to as "tokenization"). In one embodiment, the default delimiter set is {' ', '\n', '\r', ',', '\t', '=', '|', ';', '[', ']', '(', ')', '<', '>', '{', '}', '#', '\'', '"', '0'}, and the default trimming policy is to ignore special characters (other than {'/', '–', '+'}) that occur at the beginning or end of a token. Delimiters can be either static or context-sensitive. Examples of context sensitive delimiters are {':', '/'} which are considered delimiters only when they follow what looks like an IP address. This is to handle a combination of an IP address and a port number, such as 10.10.10.10/80 or 10.10.10.10:80, which is common in events. If these characters were included in the default delimiter set, then file names and URLs would be split into multiple tokens, which would be inaccurate. Any contiguous string of untrimmed non-delimiter characters is considered to be a token. In one embodiment, the tokenizer 140 uses a finite state machine (rather than regular expressions) for performance reasons.

In general, any tokenizer can be used to split an unstructured event into tokens based on a set of delimiters and a trimming policy. One example of a publicly available tokenizer is java.util.StringTokenizer, which is part of the Java standard library. StringTokenizer uses a fixed delimiter string of one or more characters (e.g., the whitespace character) to split a string into multiple strings. The problem with this approach is the inflexibility of using the same delimiter regardless of context. Another approach is to use a list of known regular expression patterns and identify the matching portions of the string as tokens. The problem with this approach is performance.

In addition to splitting an unstructured event into tokens, the tokenizer 140 also captures pieces of information contained in the tokens and extracts one or more "features" associated with each token. The features are used by the probabilistic mapper 150 to classify the tokens (i.e., to determine the appropriate fields of the structured event schema to which the tokens should be mapped), similar to how a Naïve Bayesian classifier operates. In one embodiment, a token is associated with one or more features, as shown in Table 1.

TABLE 1

Features and definitions

| Feature | Definition |
|---|---|
| Value | Literal value of the token (e.g., a text string) |
| Index | Index of the token among all tokens within the unstructured event |

TABLE 1-continued

Features and definitions

| Feature | Definition |
|---|---|
| Type | Inferred, as described below (e.g., TimeStamp, IPAddress, MacAddress, HostName, FileName, UserName, Number, URL, Word, or Unknown; other Types and/or different numbers of Types are also possible) |
| Position | Normalized position among tokens of the inferred Type (e.g., Only, First, Last, or Middle). If there is only one token of the given type, the position is Only. If there are two tokens of the given type, the tokens will have positions First and Last. If there are more than two tokens, all but the first and last tokens will have position Middle. |
| Type_Position | A compound feature that combines two individual features: Type and Position (e.g., IPAddress.Only or FileName.First) |
| Previous_Type | Type of the immediately preceding token (if any) |
| Previous_Word | Word immediately preceding this token (specifically, the Value feature of the token with a Type of Word that immediately precedes this token) |
| Previous_Previous_Word | Word immediately preceding the Word immediately preceding this token (specifically, the Value feature of that token) |
| Next_Type | Type of the immediately following token (if any) |
| Next_Word | Word immediately following this token (specifically, the Value feature of that token) |

Note that other features and/or different numbers of possible features can be used in various embodiments. Also, features can be defined differently. For example, the Position feature could have possible values of First, Second, Third, etc.

The tokenizer 140 infers the type (Type) of a token based on the Value of the token, as shown in Table 2.

TABLE 2

Types and value characteristics

| Type | Value Characteristics |
|---|---|
| TimeStamp | Any set of tokens that form a known timestamp format. In one embodiment, 20 different timestamp formats are known. |
| IPAddress | Four 1- to 3-digit decimal numbers separated by "." |
| MacAddress | Six 2-digit hexadecimal numbers separated by ":" |
| HostName | Contains more than one "." and ends with a top-level domain (TLD) (e.g., .com or .org) |
| FileName | Begins with "/" or "\" or contains more than one "/" or "\" or is of the form "<letter>:\" (e.g., C:\) |
| UserName | Contains "@" |
| Number | One or more digits |
| URL | Begins with "http" |
| Word | Used as the default type when the other types don't match |
| Unknown | Used for delimiter characters and characters that need to be trimmed from tokens (i.e., the characters that occur in between tokens) |

Note that other Types and/or different numbers of possible Types can be used in various embodiments. Also, Types can be associated with different Value characteristics. For example, Types can be defined for an IPv6 address (e.g., IPv6Address) or a floating point number (e.g., FloatingPointNumber).

As an example, consider the following unstructured event: Oct 11 15:19:57 40.0.0.30 File loaded /images/temp/appgsett.htm The tokenizer 140 splits the event into tokens and extracts features for each token. The tokens and features are stored in a token feature table 160 as shown in Table 3.

TABLE 3

Tokens and features

| Index | Value | Prev. Type | Prev. Word | Prev. Prev. Word | Next Type | Next Word | Type | Position | Type.Position |
|---|---|---|---|---|---|---|---|---|---|
| 1 | Oct 11 15:19:57 | | | | IP Address | File | Time Stamp | Only | TimeStamp.Only |
| 2 | 40.0.0.30 | Time Stamp | | | Word | File | IP Address | Only | IPAddress.Only |
| 3 | File | IP Address | | | Word | loaded | Word | First | Word.First |
| 4 | loaded | Word | File | | File Name | | Word | Last | Word.Last |
| 5 | /images/temp/appgsett.htm | Word | loaded | File | | | File Name | Only | FileName.Only |

In Table 3, each row represents one token. The first column contains an index number for the token (here, a value from 1 to 5). The remaining columns contain features of the token (Value, Previous Type, Previous Word, Previous Previous Word, Next Type, Next Word, Type, Position, and Type.Position).

The probabilistic mapper 150 determines, for a particular token and a particular field, the probability that that token maps to that field (referred to as a "field mapping probability"). The probabilistic mapper determines this probability according to the Naïve Bayesian probability model. Thus, the probabilistic mapper operates non-deterministically (i.e., based on probabilities rather than certainties). The premise is that unfamiliar unstructured events share many similarities with events that have been parsed in the past. By examining how tokens of past events were mapped, an educated guess can be made as to how the unfamiliar tokens should be mapped.

Given the features associated with a token (e.g., as stored in the token feature table 160), the probabilistic mapper 150 calculates the probability of the token mapping to a particular field according to the Naïve Bayesian probability model, whose workings will now be explained. Mathematically, the probability of a token with features $F_1$ through $F_5$ mapping to a particular field Field can be expressed using Bayes' theorem as:

$$P(\text{Field given } F_1, F_2, F_3, F_4, F_5) = \frac{P(\text{Field}) \times P\left(\begin{array}{c} F_1, F_2, F_3, F_4, \\ F_5 \text{ given Field} \end{array}\right)}{P(F_1, F_2, F_3, F_4, F_5)}$$

If we assume that the features are statistically independent (i.e., that no two features are related), then the formula simplifies to its Naïve equivalent listed below. In reality, features are never completely independent, so we might get erroneous probabilities. However, since we are interested in only relative probabilities (not absolute probabilities) of a token mapping to various fields, the error is usually acceptable.

$$P\left(\begin{array}{c} \text{Field given } F_1, F_2, \\ F_3, F_4, F_5 \end{array}\right) \approx \frac{P(\text{Field}) \times P(F_1 \text{given Field}) \times \ldots \times P(F_5 \text{given Field})}{P(F_1) \times \ldots \times P(F_5)}$$

As mentioned previously, each token is evaluated for its probability of mapping to each field in the schema. To illustrate how the probabilistic mapper 150 functions, let us consider the exemplary unstructured event introduced above Oct 11 15:19:57 40.0.0.30 File loaded /images/temp/appgsett.htm and the Common Event Format (CEF) and one particular combination—the probability that Token #5 (/images/temp/appgsett.htm) maps to the field "FileName" within CEF.

$$P\left(\begin{array}{c} \text{Token5} \Leftrightarrow \textit{fileName} \\ \text{GIVEN} \\ \text{Token.Value} = /\text{images}/\ldots \\ \text{Token.Type.Position} = \textit{FileName}.\text{Only} \\ \text{Token}.\textit{PrevWord} = \text{loaded} \\ \text{Token}.\textit{PrevPrevWord} = \text{File} \\ \text{Token}.\textit{NextWord} = \text{null} \end{array}\right) \approx$$

$$\frac{\begin{array}{c} P(\textit{fileName}) \times \\ P(\text{Value} = /\text{images}/\ldots \textit{amongfileNames}) \times \\ P(\text{Type.Position} = \textit{FileName}.\text{Only} \textit{amongfileNames}) \times \\ P(\textit{PrevWord} = \text{loaded} \textit{amongfileNames}) \times \\ P(\textit{PrevPrevWord} = \text{File} \textit{amongfileNames}) \times \\ P(\textit{NextWord} = \text{null} \textit{amongfileNames}) \end{array}}{\begin{array}{c} P(\text{Value} = /\text{images}/\ldots) \times \\ P(\text{Type.Position} = \textit{FileName}.\text{Only}) \times \\ P(\textit{PrevWord} = \text{loaded}) \times \\ P(\textit{PrevPrevWord} = \text{File}) \times \\ P(\textit{NextWord} = \text{null}) \end{array}}$$

The quantities on the right hand side of the equation can be calculated quite easily from the field mapping statistics 160 (collected from training data, discussed below).

At the end of this exercise, we have a number that represents the probability of Token #5 (/images/temp/appgsett.htm) mapping to the field FileName. Similarly, Token #5 is evaluated against all the other fields in the schema (here, CEF). The resulting numbers in descending order represent the most likely field mappings. Similarly, each of the tokens is evaluated against each field in the schema to find the best fit.

The above example used five features associated with a token. However, any features (and any number of features) can be used. For example, in one embodiment, only four features are used, and the four features are chosen from among the ten features shown in Table 1. Note that if a feature is not used by the probabilistic mapper 150, then that feature need not be stored in the token feature table 160. Table 4 shows various sets of features that can be used by the probabilistic mapper 150, according to various embodiments of the invention.

TABLE 4

Features used by probabilistic mapper

| Number of Features Used | Features |
|---|---|
| 4 | Index, Type_Position, Previous_Word, Next_Word |
| 5 | Index, Type_Position, Previous_Previous_Word, Next_Type, Next_Word |
| 6 | Value, Index, Type, Previous_Type, Previous_Word, Next_Type |
| 7 | Value, Index, Type, Type_Position, Previous_Word, Next_Type, Next_Word |
| 8 | Value, Index, Type, Position, Previous_Word, Previous_Previous_Word, Next_Type, Next_Word |
| 9 | Value, Index, Type, Position, Previous_Type, Previous_Word, Previous_Previous_Word, Next_Type, Next_Word |
| 10 | Value, Index, Type, Position, Type_Position, Previous_Type, Previous_Word, Previous_Previous_Word, Next_Type, Next_Word |

The storage 120 stores a token feature table 160, an unstructured event 170, a structured event 180, and field mapping statistics 190. Initially, when the system 100 has not yet been used, the token feature table 160, the unstructured event 170, and the structured event 180 have not yet been created.

The token feature table 160 stores information regarding tokens and their features. The token feature table 160 was explained above, and one example was illustrated in Table 3.

The unstructured event 170 is a data instance of log data. The unstructured event 170 can be, for example, an entry in a log file, an entry in a syslog server, an alert, an alarm, a network packet, an email, or a notification page. In general, the unstructured event 170 represents a data structure that includes one or more fields, where each field can contain a value. The unstructured event 170 can be in any format.

The structured event 180 represents a data structure that includes one or more fields, where each field can contain a value. The structured event 180 adheres to a structured format or schema such as Common Event Format (CEF) or Intrusion Detection Message Exchange Format (IDMEF). Since the format of the event 180 is known, the event is referred to as "structured". The structured event 180 is a normalized version of the unstructured event 170.

As mentioned above, the probabilistic mapper 150 calculates the probability that a particular token maps to a particular field, and this calculation uses certain statistics. The field mapping statistics 190 reflect events and tokens that have been mapped successfully in the past. Specifically, the field mapping statistics 190 are made of individual entries, each of which represents a particular field (of the structured event schema) and the token that was mapped to that field (specifically, a feature of the token and that feature's value). Table 5 gives an example based on the exemplary unstructured event introduced above and CEF:

TABLE 5

Field mapping statistics

| Field | Feature | Value |
|---|---|---|
| deviceReceiptTime | Type_Position | TimeStamp.Only |
| sourceAddress | Type_Position | IPAddress.Only |
| sourceAddress | Value | 1.1.1.1 |
| sourceAddress | Previous_Word | From |
| fileName | Type_Position | FileName.Only |
| fileName | Value | C:\Windows |
| fileName | Previous_Word | loaded |

Table 5 includes entries that concern the deviceReceiptTime field (one entry), the sourceAddress field (three entries), and the fileName field (three entries). Each entry represents one occurrence of a token (with the specified feature and value) being mapped to the specified field. For example, the first entry in Table 5 represents a token whose Type_Position feature was equal to TimeStamp.Only and that was mapped to the deviceReceiptTime field. The third entry in Table 5 represents a token whose Value feature was equal to 1.1.1.1 and that was mapped to the sourceAddress field.

In Table 5, each entry in the field mapping statistics represents only one occurrence of a token (with the specified feature and value) being mapped to the specified field. In another embodiment, identical entries are aggregated, and the number of aggregated entries is stored. Table 6 gives an example:

TABLE 6

Field mapping statistics (aggregated)

| Field | Feature | Value | Count |
|---|---|---|---|
| deviceReceiptTime | Type_Position | TimeStamp.Only | 48457 |
| sourceAddress | Type_Position | IPAddress.Only | 28734 |
| sourceAddress | Value | 1.1.1.1 | 234 |
| sourceAddress | Previous_Word | From | 2332 |
| fileName | Type_Position | FileName.Only | 8746 |
| fileName | Value | C:\Windows | 293 |
| fileName | Previous_Word | loaded | 987 |

In Table 6, each entry includes a number ("count") that indicates the number of identical entries that have been aggregated (i.e., how many times that particular feature occurred in that field). Recall that the first entry in the table represents a token whose Type_Position feature was equal to TimeStamp.Only and that was mapped to the deviceReceiptTime field. The corresponding count of 48457 indicates that tokens whose Type_Position features were equal to TimeStamp.Only have been mapped to the deviceReceiptTime field 48,457 times.

As mentioned above with respect to the probabilistic mapper 150, the quantities on the right hand side of the Bayesian equation can be calculated quite easily from the field mapping statistics 190, as follows:

$$P(fileName) = \frac{Total\,number\,of\,fileName\,entries}{Total\,number\,of\,entries}$$

and $$P\left(\begin{array}{c} Type.Position = FileName.Only \\ among\,fileNames \end{array}\right) = \frac{Number\,of\,fileNames\,whose\,Type.Position\,feature = FileName.Only}{Total\,number\,of\,fileNames}$$

and $$P(PrevPrevWord = File) = \frac{Total\,number\,of\,PrevPrevWords\,whose\,value = File}{Total\,number\,of\,PrevPrevWords}$$

Figure 2:
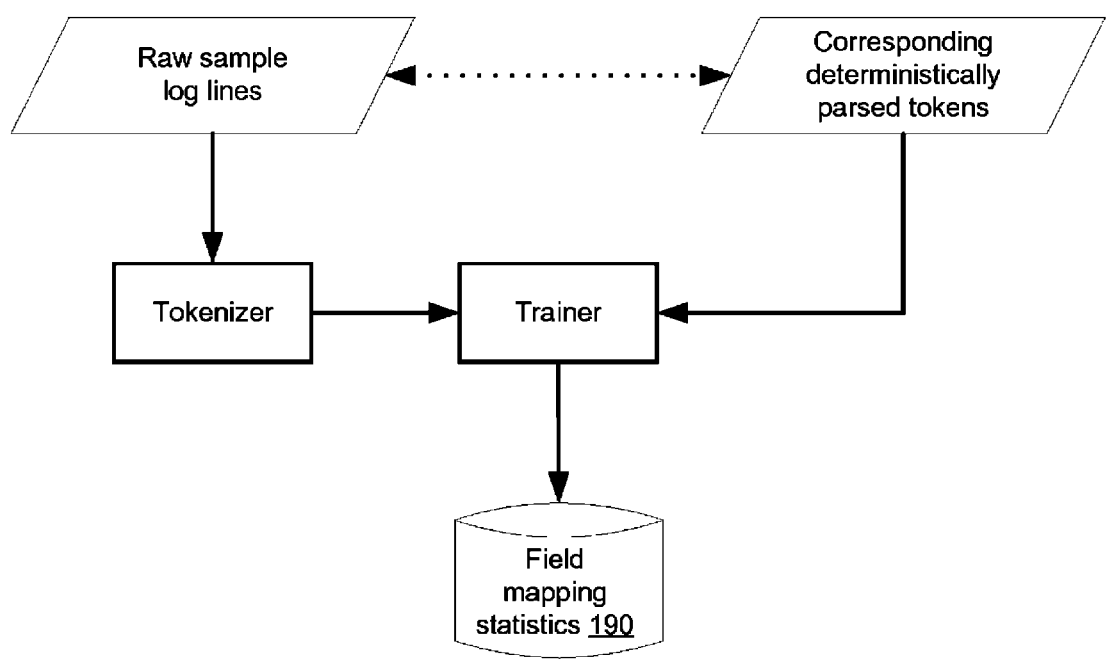
FIG. 2 is a block diagram of a system for generating field mapping statistics, according to one embodiment of the invention.

The field mapping statistics 190 used by the probabilistic mapper 150 to calculate the field mapping probabilities mentioned above are collected by a "trainer" that compares tokenized logs/events with their correctly (deterministically) parsed field values. For each field, the trainer adds a corresponding entry to the table (or increments an existing aggregate entry, thereby counting the number of times it has seen a particular feature). This process is shown in FIG. 2. FIG. 2 is a block diagram of a system for generating field mapping statistics, according to one embodiment of the invention.

In one embodiment, the unstructured event parser 110 operates as follows: For each token produced by the tokenizer 140, the probabilistic mapper 150 calculates the probability of the token mapping to each field in the structured event schema. The calculation uses the field mapping statistics 190. The results are ordered by descending probability. If the maximum probability falls below a threshold, then the probabilistic mapper 150 decides not to map the token to any field. Otherwise, the calculated fields are ordered by descending probability, and the token is mapped to the most likely field.

Figure 3:
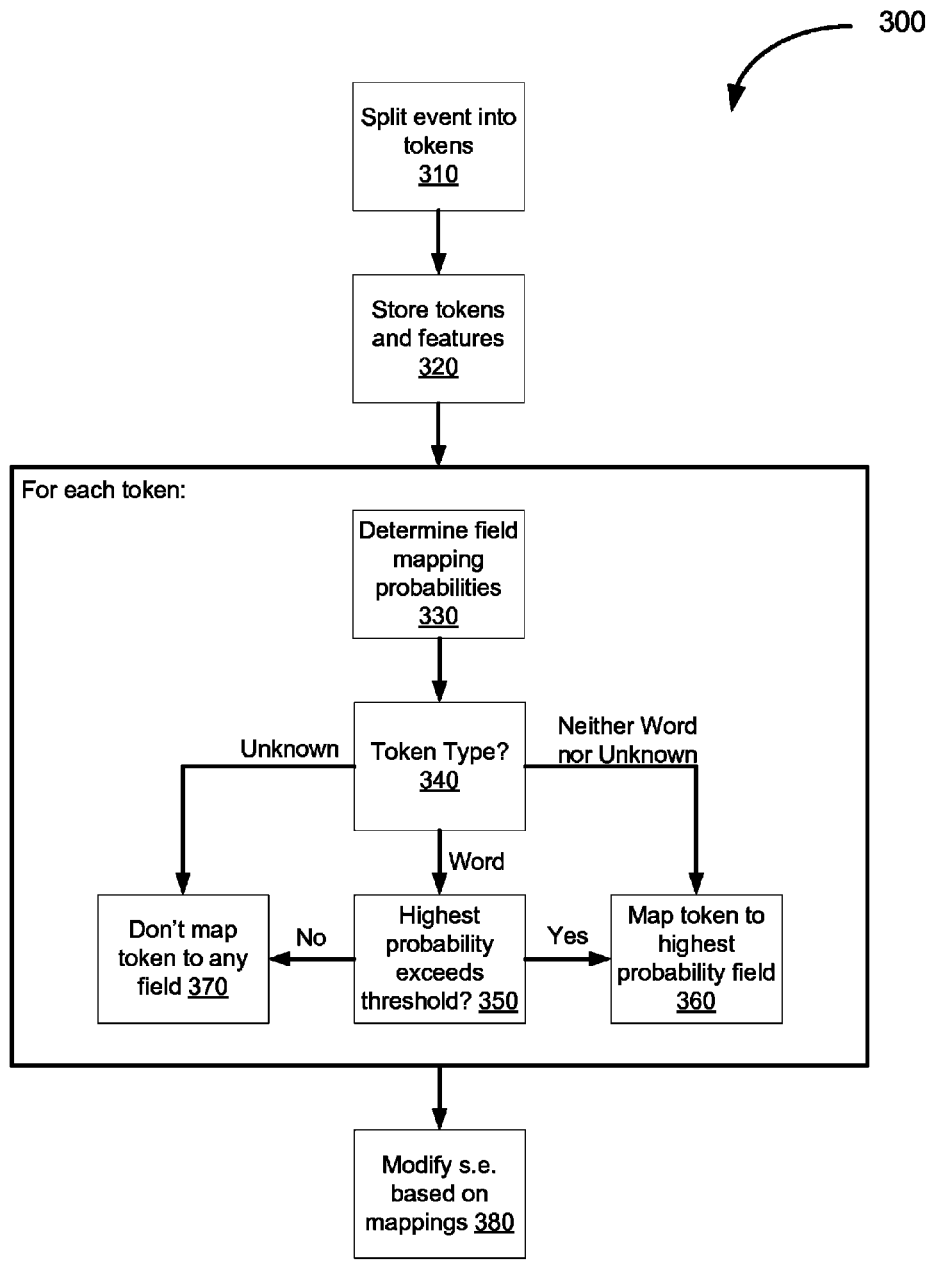
FIG. 3 is a flowchart of a method for analyzing an event that is in unstructured form and generating an event that is in structured form, according to one embodiment of the invention.

FIG. 3 is a flowchart of a method for analyzing an event that is in unstructured form and generating an event that is in structured form, according to one embodiment of the invention. When the method 300 begins, an unstructured event is already stored in storage 120 as unstructured event 170. Also, field mapping statistics are stored in storage 120 as field mapping statistics 190. Finally, token feature table 160 and structured event 180 are empty (e.g., null) or initialized (e.g., to zero). When the method 300 finishes, structured event 180 will contain a normalized version of unstructured event 170.

In step 310, an unstructured event is split into tokens. For example, the control module 130 uses the tokenizer 140 to split the contents of unstructured event 170 into tokens.

In step 320, the tokens and features of the unstructured event are stored. For example, the control module 130 uses the tokenizer 140 to extract the features from unstructured event 170 and store the features and tokens in the token feature table 160.

Next, a series of steps is performed for each token within unstructured event 170. This series includes steps 330 and 340 and might also include steps 350, 360, and/or 370. In step 330, field mapping probabilities are determined. For example, the control module 130 uses the probabilistic mapper 150 to determine one probability for each field of the structured schema, where the one probability represents the likelihood that the token should be mapped to that field. The probabilistic mapper 150 determines the probabilities using the token feature table 160 and the field mapping statistics 190, as explained above. In one embodiment, for each token, the probabilistic mapper 150 returns a list of <field, probability> pairs in descending order of probability.

In step 340, a determination is made regarding the Type of the token. For example, the control module 130 accesses the token's Type within the token feature table 160. If the Type is Unknown, then the method proceeds to step 370, and the token is not mapped to any field. If the Type is neither Word nor Unknown, then the method proceeds to step 360, and the token is mapped to the field with the highest field mapping probability. For example, the <field, probability> pair with the highest probability is identified, and the token is mapped to the corresponding field. If the Type is Word, then the method proceeds to step 350.

In step 350, a determination is made regarding whether the highest field mapping probability exceeds a threshold. For example, the control module 130 compares the highest field mapping probability to the threshold. If the highest field mapping probability exceeds the threshold, then the method proceeds to step 360, and the token is mapped to the field with the highest field mapping probability. If the highest field mapping probability does not exceed the threshold, then the method proceeds to step 370, and the token is not mapped to any field.

In one embodiment, a threshold is used for only tokens whose Type is Word. Tokens of other Types (e.g., Number or URL) are automatically mapped to the most likely field even if that field mapping probability is lower than the threshold. In one embodiment, the threshold is configurable on a per-event basis. In another embodiment, the threshold is fixed for multiple events, since configuring the threshold per event can be impractical.

At this point, all of the tokens within unstructured event 170 have been processed. Each token has been either mapped to a particular field or mapped to no field. In step 380, structured event 180 is modified based on the token mappings. For example, for each token that was mapped, the control module 130 sets a value of the appropriate field in the structured event 180. In one embodiment, if the field is meant to store a string, then the token's Value is directly mapped to the field (i.e., the Value is not changed). In another embodiment, if the field is meant to store a number, then the token's Value is parsed and mapped as a number. In another embodiment, if the field is meant to store an IP address, MAC address, or timestamp, then the token's Value is converted to its respective long numerical representation as per generally accepted conventions.

Note that it is possible for two tokens to have been mapped to the same field during step 360 (e.g., because that field yielded the highest field mapping probability for each token among the various fields). In one embodiment, if this happens, then the token with the highest probability (for that field) is actually mapped to that field. This potential conflict is why the structured event 180 is not modified immediately after each mapping is determined in step 360.

When step 380 finishes, structured event 180 contains a normalized version of unstructured event 170.

The probabilistic mapper 150 was described above in conjunction with a system and a method that analyze an event that is in unstructured form and generate an event that is in structured form. However, the probabilistic mapper 150 can be used in other ways.

A "regular expression" provides a concise and flexible means for matching alphanumeric strings, such as particular characters, words, or patterns of characters. A regular expression is written in a formal language that can be interpreted by a regular expression processor, which is a program that either generates a parser or examines text and identifies parts that match a provided specification.

Manually authoring a regular expression ("regex") can be difficult. In one embodiment, a "regex creator" receives an event that is in unstructured form and outputs a regular expression that matches and/or extracts token values from the event. That regular expression can then be used by a regular expression processor. This regex creator uses the probabilistic mapper 150.

Figure 4:
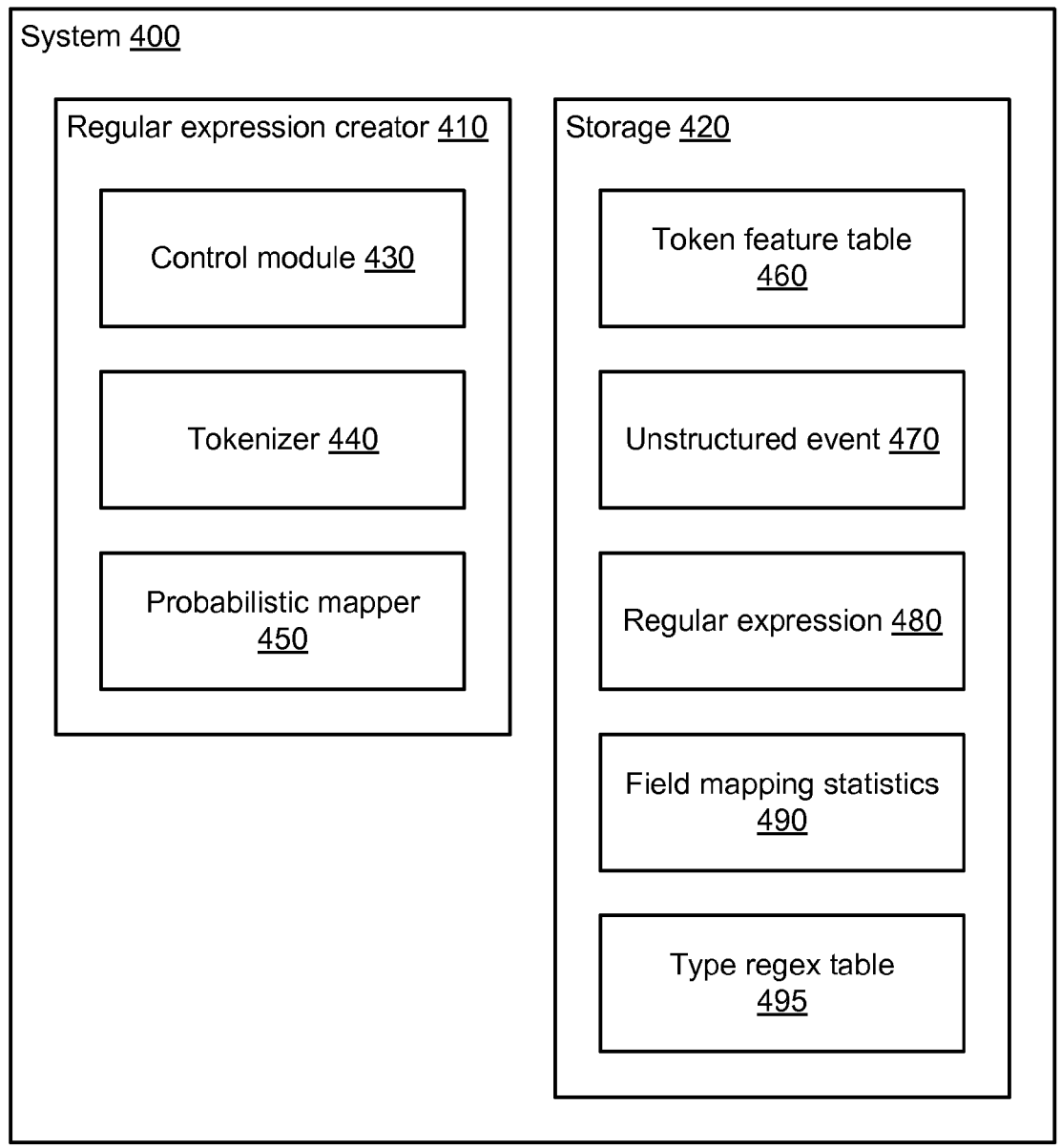
FIG. 4 is a block diagram of a system for generating a regular expression to match or extract token values from an event that is in unstructured form, according to one embodiment of the invention.

FIG. 4 is a block diagram of a system for generating a regular expression to match or extract token values from an event that is in unstructured form, according to one embodiment of the invention. The system 400 is able to generate a regular expression ("regex") to match or extract token values from an event that is in unstructured form. The regex is generated automatically, without manual input or interaction. The illustrated system 400 includes a regular expression (regex) creator 410 and storage 420.

In one embodiment, the regex creator 410 (and its component modules) is one or more computer program modules stored on one or more computer readable storage mediums and executing on one or more processors. The storage 420 (and its contents) is stored on one or more computer readable storage mediums. Additionally, the regex creator 410 (and its component modules) and the storage 420 are communicatively coupled to one another to at least the extent that data can be passed between them.

The regex creator 410 includes multiple modules, such as a control module 430, a tokenizer 440, and a probabilistic mapper 450. The control module 430 controls the operation of the regex creator 410 (i.e., its various modules) so that the regex creator 410 can generate a regex based on an unstructured event. The operation of control module 430 will be discussed below with reference to FIG. 5.

The tokenizer 440 is similar to the tokenizer 140 that was described above. The probabilistic mapper 450 is similar to the probabilistic mapper 150 that was described above.

The storage 420 stores a token feature table 460, an unstructured event 470, a regular expression (regex) 480, field mapping statistics 490, and a Type regular expression (regex) table 495. Initially, when the system 400 has not yet been used, the token feature table 460, the unstructured event 470, and the regex 480 have not yet been created.

The token feature table 460 is similar to the token feature table 160 that was described above. The unstructured event 470 is similar to the unstructured event 170 that was described above. The field mapping statistics 490 is similar to the field mapping statistics 190 that was described above.

The regular expression (regex) 480 matches the unstructured event 470 and/or extracts token values from the unstructured event 470.

The Type regular expression (regex) table 495 stores <Type, regex> pairs, where the Type is a type of a token (e.g., Word), and the regex matches a Value for a token of that Type. Table 7 shows an example of the Type regex table 495, according to one embodiment of the invention.

Corp. of Redwood Shores, Calif. Table 7 lists the formats of timestamps that are automatically recognized (the list is configurable) and the regular expressions to which they are mapped.

In one embodiment, the regular expression creator 410 operates as follows: The regex 480 is built incrementally. For each token in the unstructured event 470, a determination is made regarding whether the token should be treated as a variable or as a literal. If the token should be treated as a variable, then an appropriate regex is obtained from the Type regex table 495 based on the token's Type. The appropriate regex is appended to the contents of the regex 480. (If the token value is to be extracted, and not merely matched, then the appropriate regex is surrounded by parentheses before adding it to the regex 480.) If the token should be treated as a literal, then the Value of the token is appended to the contents

TABLE 7

Types and regular expressions

| Type | Regular Expression (regex) |
|---|---|
| TimeStamp | The regular expression for a timestamp depends on the format of the timestamp. Each line below includes a timestamp format followed by a regular expression that matches a timestamp that adheres to that format.<br>EEE MMM dd HH:mm:ss yyyy \S+ \S+ +\d+ \d+:\d+:\d+ \d+<br>EEE MMM d HH:mm:ss yyyy \S+ \S+ +\d+ \d+:\d+:\d+ \d+<br>EEE MMM dd HH:mm:ss \S+ \S+ +\d+ \d+:\d+:\d+<br>dd/MMM/yyyy:HH:mm:ss ZZZZZ \d+/\S+/\d+:\d+:\d+:\d+ \S+<br>MM/dd-HH:mm:ss.SSSSSS \d+/\d+−\d+:\d+:\d+\.\d+<br>MMM dd yyyy HH:mm:ss \S+ \d+ \d+ \d+:\d+:\d+<br>yyyy/MM/dd HH:mm:ss zzz \d+/\d+/\d+ \d+:\d+:\d+ \S+<br>yyyy/MM/dd HH:mm:ss \d+/\d+/\d+ \d+:\d+:\d+<br>yyyy-MM-dd HH:mm:ss \d+−\d+−\d+ \d+:\d+:\d+<br>yyyy-MM-dd HH:mm:ss \d+−\d+−\d+ +\d+:\d+:\d+<br>MM/dd/yyyy HH:mm:ss zzz \d+/\d+/\d+ \d+:\d+:\d+ \S+<br>MM/dd/yyyy HH:mm:ss \d+/\d+/\d+ +\d+:\d+:\d+<br>M/dd/yy HH:mm:ss.SSS zzz \d/\d+/\d+ \d+:\d+:\d+:\d+ \S+<br>M/dd/yy H:mm:ss.SSS zzz \d/\d+/\d+ \d:\d+:\d+:\d+ \S+<br>MM/dd/yy HH:mm:ss.SSS zzz \d+/\d+/\d+ \d+:\d+:\d+:\d+ \S+<br>MM/dd/yyyy HH:mm:ss.SSS zzz \d+/\d+/\d+ \d+:\d+:\d+:\d+ \S+<br>MM/dd/yyyy HH:mm:ss.SSS \d+/\d+/\d+ \d+:\d+:\d+:\d+<br>MMM dd, yyyy hh:mm:ss aa zzz \S+ \d+, \d+ \d+:\d+:\d+ \S+ \S+<br>MMM dd, yyyy h:mm:ss aa zzz \S+ \d+, \d+ \d:\d+:\d+ \S+ \S+<br>MMM dd, yyyy HH:mm:ss.SSS \S+ \d+, \d+ \d+:\d+:\d+.\d+<br>yyyy-MM-dd-HH.mm.ss.SSSSSS \d+−\d+−\d+−\d+.\d+.\d+.\d+<br>yyyy-MM-dd HH:mm:ss.SSSSSS \d+−\d+−\d+ \d+:\d+:\d+.\d+<br>MMM dd yyyy HH:mm:ss \S+ +\d+ \d+ \d+:\d+:\d+<br>MMM dd HH:mm:ss.SSS ZZZ \S+ +\d+ \d+:\d+:\d+ \S+<br>MMM dd HH:mm:ss.SSS \S+ +\d+ \d+:\d+:\d+\.\d+<br>MM/dd/yyyy HH:mm:ss.SSSSSS \d+/\d+/\d+ \d+:\d+:\d+.\d+<br>MM/dd-HH:mm:ss.SSSSSS \d+/\d+−\d+:\d+:\d+.\d+<br>yyyy MMM dd HH:mm:ss zzz ZZZZZ \d+ \S+ \d+ \d+:\d+:\d+ \S+ \S+ |
| IPAddress | \d+\.\d+\.\d+\.\d+ |
| MacAddress | .{2}:.{2}:.{2}:.{2}:.{2}:.{2} |
| HostName | \S+ |
| FileName | \S+ |
| UserName | \S+ |
| Number | \d+ |
| URL | \S+ |
| Word | \S+ |
| Unknown | None. (A token of the Type Unknown is always retained as a literal, since an Unknown token is just a collection of characters that lie between tokens of the Types listed above. An Unknown token usually includes delimiters and/or trimmed characters.) |

In one embodiment, the tokenizer handles timestamps differently. For example, the tokenizer clumps individual timestamp-components into a single token if the components look like they could be part of a timestamp. The tokenizer then compares the timestamp-components with one or more known timestamp formats. For an example of known timestamp formats, see the SimpleDateFormat class in the java.text package of Java™ Platform Standard Edition 6 from Oracle of the regex 480. After all of the tokens have been processed, the content of the regex 480 is returned.

Figure 5:
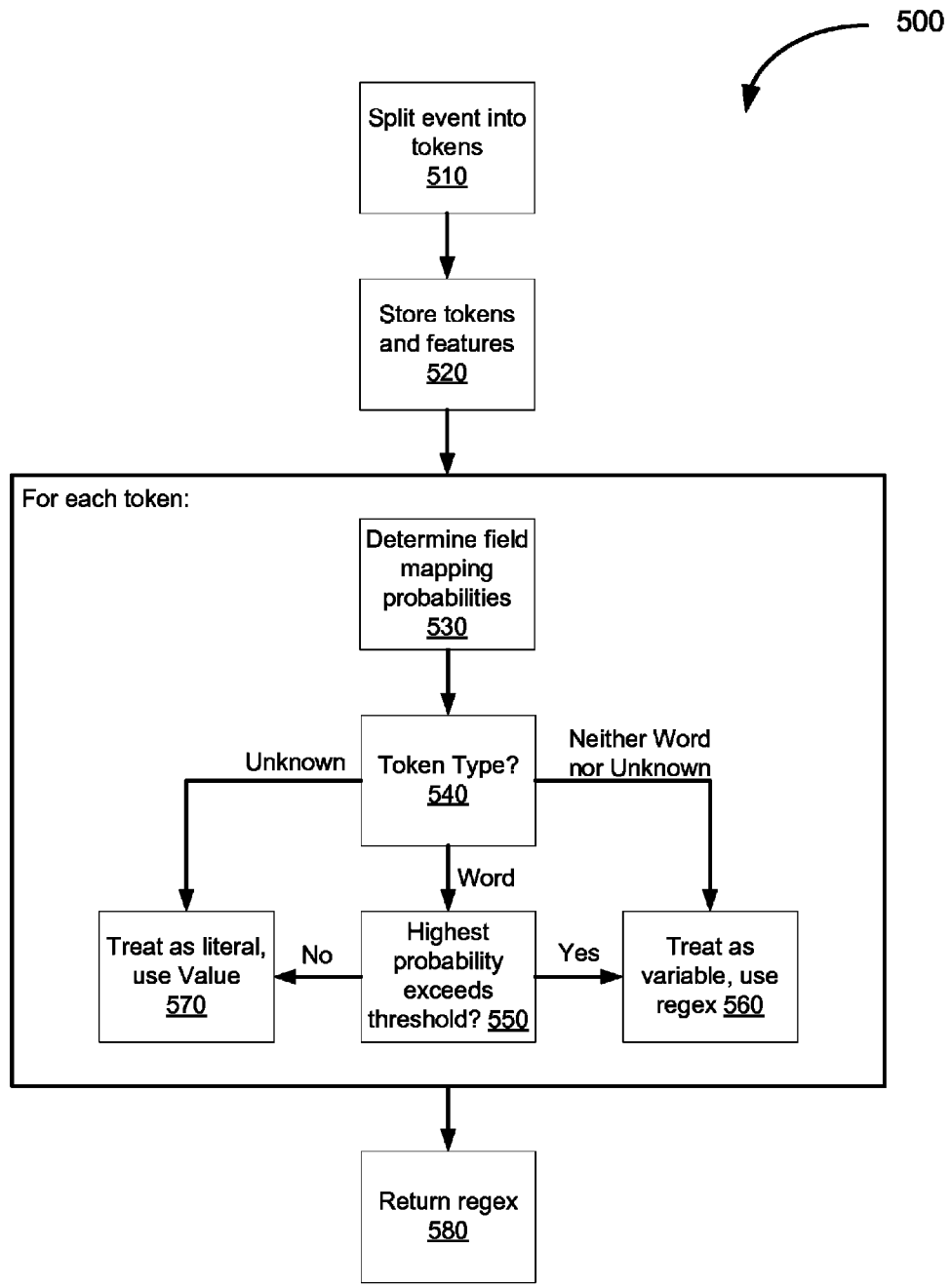
FIG. 5 is a flowchart of a method for generating a regular expression to match or extract token values from an event that is in unstructured form, according to one embodiment of the invention.

FIG. 5 is a flowchart of a method for generating a regular expression to match or extract token values from an event that is in unstructured form, according to one embodiment of the invention. When the method 500 begins, an unstructured event is already stored in storage 420 as unstructured event 470. Also, field mapping statistics are stored in storage 420 as field mapping statistics 490, and <Type, regex> pairs are stored in storage 420 as Type regex table 495. Finally, token feature table 460 and regex 480 are empty (e.g., null) or initialized (e.g., to zero). When the method 500 finishes, regex 480 will contain a regex that can match or extract token values from the unstructured event 470.

In step 510, an unstructured event is split into tokens. For example, the control module 430 uses the tokenizer 440 to split the contents of unstructured event 470 into tokens.

In step 520, the tokens and features of the unstructured event are stored. For example, the control module 430 uses the tokenizer 440 to extract the features from unstructured event 470 and store the features and tokens in the token feature table 460.

Next, a series of steps is performed for each token within unstructured event 470. This series includes steps 530 and 540 and might also include steps 550, 560, and/or 570. In step 530, field mapping probabilities are determined. For example, the control module 430 uses the probabilistic mapper 450 to determine one probability for each field of the structured schema, where the one probability represents the likelihood that the token should be mapped to that field. The probabilistic mapper 450 determines the probabilities using the token feature table 460 and the field mapping statistics 490, as explained above. In one embodiment, for each token, the probabilistic mapper 450 returns a list of <field, probability> pairs in descending order of probability.

In step 540, a determination is made regarding the Type of the token. For example, the control module 430 accesses the token's Type within the token feature table 460. If the Type is Unknown, then the method proceeds to step 570, and the token is treated as a literal. The Value of the token is appended 570 to the contents of the regex 480. If the Type is neither Word nor Unknown, then the method proceeds to step 560, and the token is treated as a variable. An appropriate regex is obtained from the Type regex table 495 based on the token's Type. For example, the control module 430 accesses the token's Type within the Type regex table 495 and obtains the associated regex. The appropriate regex is appended to the contents of the regex 480. (If the token value is to be extracted, and not merely matched, then the appropriate regex is surrounded by parentheses before adding it to the regex 480.) If the Type is Word, then the method proceeds to step 550.

In step 550, a determination is made regarding whether the highest field mapping probability exceeds a threshold. For example, the control module 430 compares the highest field mapping probability to the threshold. If the highest field mapping probability exceeds the threshold, then the method proceeds to step 560, and the token is treated as a variable. The appropriate regex is appended to the contents of the regex 480, as described above. (If the token value is to be extracted, and not merely matched, then the appropriate regex is surrounded by parentheses before adding it to the regex 480.) If the highest field mapping probability does not exceed the threshold, then the method proceeds to step 570, and the token is treated as a literal. The Value of the token is appended 570 to the contents of the regex 480, as explained above.

In one embodiment, a threshold is used for only tokens whose Type is Word. Tokens of other Types (e.g., Number or URL) are automatically treated as variables even if that field mapping probability is lower than the threshold. In one embodiment, the threshold is configurable on a per-event basis. In another embodiment, the threshold is fixed for multiple events, since configuring the threshold per event can be impractical.

At this point, all of the tokens within unstructured event 470 have been processed. Each token has been treated as either a literal or a variable, and the contents of the regex 480 has been modified accordingly. Regex 480 now contains a regex that matches or extracts token values from unstructured event 470. In step 580, the contents of regex 480 is returned.

The probabilistic mapper 150 can also be used in other ways. Consider a "normalized event generator" that takes as input an unstructured event, applies a regular expression to the event to extract token values, maps the token values to a schema, and outputs an event that adheres to the schema (a "normalized event"). The operation of the normalized event generator varies based on a) the regular expression and b) the mapping of the token values to the schema (the "normalized schema"). Since the regular expression and the mapping are static, the operation of the normalized event generator is deterministic. This deterministic operation is fundamentally different from the non-deterministic operation of the unstructured event parser 110 described above.

In one embodiment, a normalized event generator is parameterized so that the regular expression and the token mappings are stored in a "parameter file" that exists separately from the rest of the normalized event generator. In one embodiment, the regular expression and the token mappings are expressed as properties in a properties file. For example, the parameter file is a Java Properties file, which is part of the java.util package (e.g., see the Java™ Platform Standard Edition 6 from Oracle Corp. of Redwood Shores, Calif.). For more information about using properties files to generate normalized events, see U.S. application Ser. No. 10/308,941, filed Dec. 2, 2002, entitled "Event Normalization with Software Agent of Network Security System", and U.S. application Ser. No. 12/789,318, filed May 27, 2010, entitled "Specifying a Parser Using a Properties File", both of which are hereby incorporated herein by reference.

Manually authoring a parameter file can be difficult. In one embodiment, a "parameter file creator" helps a user create a parameter file. The parameter file creator receives an unstructured event, determines a regular expression that extracts token values from the unstructured event, determines mappings from the extracted tokens to the fields of a schema, receives user input that customizes the regular expression and/or the mappings, and outputs a parameter file. That parameter file can then be used with a parameterized normalized event generator to generate a normalized event based on an unstructured event. This parameter file creator uses the probabilistic mapper 150. In one embodiment, using a probabilistic mapper 150 in this way is similar to the "FlexConnector Wizard" feature in the ArcSight SmartConnector product from ArcSight, Inc.

Figure 6:
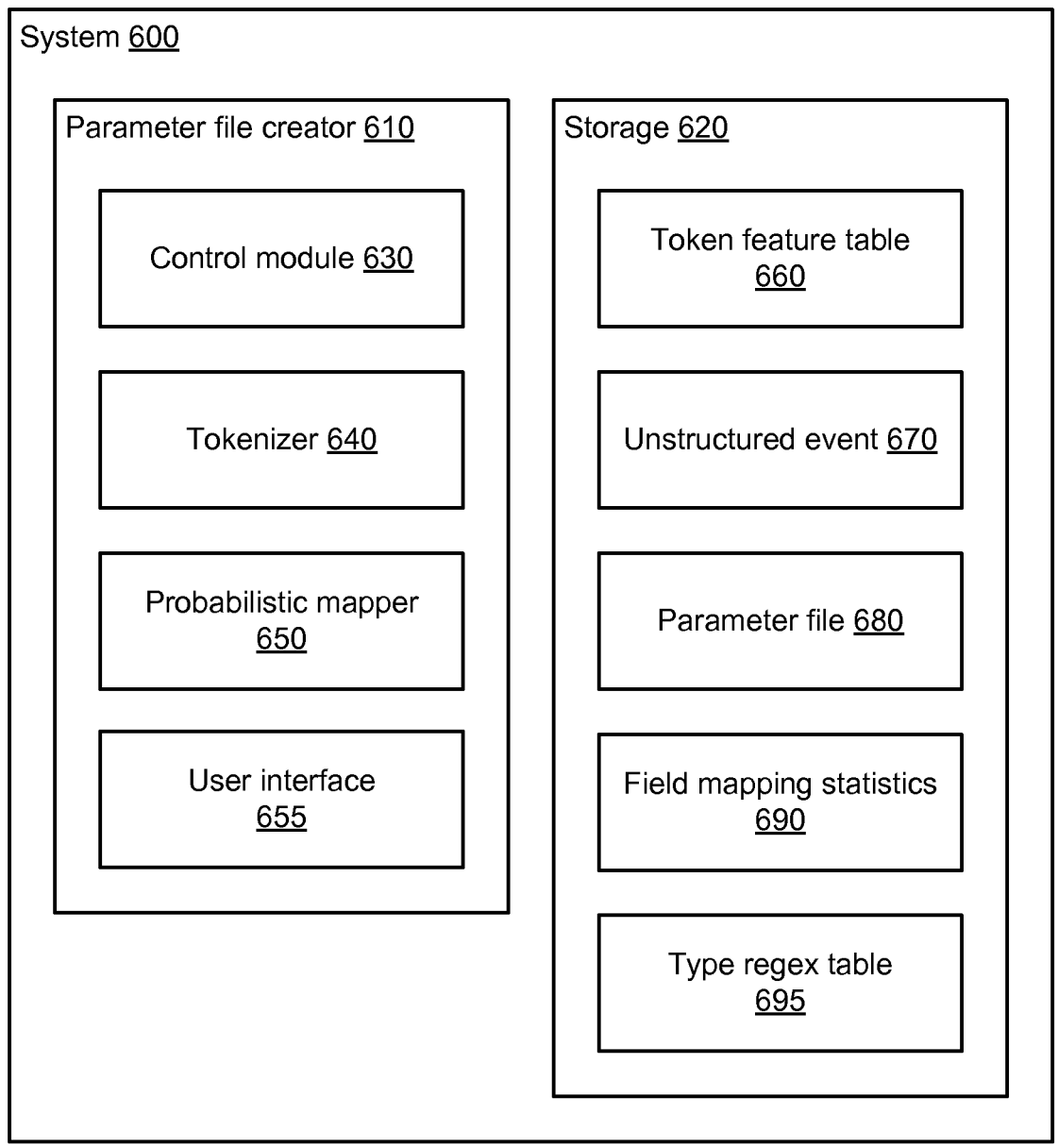
FIG. 6 is a block diagram of a system for generating a parameter file to be used with a parameterized normalized event generator to generate a normalized event based on an unstructured event, according to one embodiment of the invention.

FIG. 6 is a block diagram of a system for generating a parameter file to be used with a parameterized normalized event generator to generate a normalized event based on an unstructured event, according to one embodiment of the invention. The system 600 is able to generate a parameter file that includes a regular expression ("regex") to extract token values from an unstructured event and token mappings to map the token values to a normalized event. The parameter file is initially generated automatically (without manual input or interaction) and is then customized based on user input. The illustrated system 600 includes a parameter file creator 610 and storage 620.

In one embodiment, the parameter file creator 610 (and its component modules) is one or more computer program modules stored on one or more computer readable storage mediums and executing on one or more processors. The storage 620 (and its contents) is stored on one or more computer readable storage mediums. Additionally, the parameter file creator 610 (and its component modules) and the storage 620 are communicatively coupled to one another to at least the extent that data can be passed between them.

The parameter file creator 610 includes multiple modules, such as a control module 630, a tokenizer 640, a probabilistic mapper 650, and a user interface 655. The control module 630 controls the operation of the parameter file creator 610 (i.e., its various modules) so that the parameter file creator 610 can generate a parameter file based on an unstructured event and user input. The operation of control module 630 will be discussed below with reference to FIG. 7.

The tokenizer 640 is similar to the tokenizer 140 that was described above. The probabilistic mapper 650 is similar to the probabilistic mapper 150 that was described above.

The user interface 655 sends information to and receives information from a user. For example, the user interface 655 causes information to be displayed on a device such as a screen or monitor and receives information that was input from a device such as a keyboard, a cursor control device, or a touch screen.

The storage 620 stores a token feature table 660, an unstructured event 670, a parameter file 680, field mapping statistics 690, and a Type regular expression (regex) table 695. Initially, when the system 600 has not yet been used, the token feature table 660, the unstructured event 670, and the parameter file 680 have not yet been created.

The token feature table 660 is similar to the token feature table 160 that was described above. The unstructured event 670 is similar to the unstructured event 170 that was described above. The field mapping statistics 690 is similar to the field mapping statistics 190 that was described above. The Type regular expression (regex) table 695 is similar to the Type regex table 495 that was described above.

The parameter file 680 includes a regular expression that extracts token values from the unstructured event 670 and token mappings to map the token values to the fields of a normalized event. The parameter file 680 is meant to be used with a parameterized normalized event generator to generate a normalized event based on an unstructured event.

In one embodiment, the parameter file creator 610 operates as follows: The parameter file 680 is built incrementally. For each token in the unstructured event 670, a determination is made regarding whether the token should be treated as a variable or as a literal. If the token should be treated as a variable, then an appropriate regex is obtained from the Type regex table 695 based on the token's Type. The appropriate regex is appended to the regex within the parameter file 680. (Since the token value is to be extracted, and not merely matched, the appropriate regex is surrounded by parentheses before appending it to the regex within the parameter file 680.) Suggested field mappings for that token (i.e., within the normalized schema) are stored. If the token should be treated as a literal, then the Value of the token is appended to the regex within the parameter file 680.

After all of the tokens have been processed, the user is presented with a "suggested parse" that reflects a) the regular expression in the current parameter file 680 (which was automatically generated) and b) the stored suggested field mappings. At that point, the user can modify the suggested parse by selecting, from among the stored suggested field mappings, one field mapping for each token that was treated as a variable. The user can also modify the regex that was automatically generated. For example, the user can change a literal to a variable or vice versa. The modified regex can then be applied to the unstructured event in order to extract token values and determine field mappings. After the user is satisfied, the selected token mappings are added to the parameter file 680.

In this embodiment, multiple possible field mappings for a token are determined and presented to a user, who then selects the desired field mapping. Interactive mapping helps a user develop a deterministic parser (specifically, a parameter file for a parameterized deterministic parser). The use of interactive mapping enables most of the complexities of parsing and mapping to be hidden behind an easy to use wizard, thereby enabling users to build parsers without extensive training on specific parser syntax.

FIG. 8 is a screenshot of a graphical user interface for generating a parameter file to be used with a parameterized normalized event generator to generate a normalized event based on an unstructured event, according to one embodiment of the invention. The graphical user interface (GUI) 800 includes three sections. The first section of the GUI 800, which is at the top, is labeled "Text" and displays the unstructured event on which the parameter file is based. Here, the displayed unstructured event 810 is 10.0.186.192 - - [17/Mar/2002:00:18:05-0800] "GET /scripts/root.exe?/c+dir HTTP/1.0" 404 288 "- "-"
The displayed unstructured event 810 reflects the unstructured event 670.

The second section of the GUI 800, which is just underneath the first section, is labeled "Regex" and displays a regular expression. Here, the displayed regular expression 820 is (\d+\.\d+\.\d+\.\d+)-(\S+?) \[(\d+^S+^d+:\d+:\d+:\d+\S+)\] "(\S+?) (\S+?) (\S+?)" (\d+) (\d+) "(\S+?)" "(\S+?)"
Initially, the displayed regular expression 820 is the regular expression that was automatically generated. However, the user can modify the displayed regular expression 820 if desired.

The third section of the GUI 800, which is at the bottom, is a table that has four columns and 10 rows. From left to right, the columns are labeled Value from Sample 830, Type 840, Format 850, and Event Field 860. Each row of the table represents one token that was extracted from the displayed unstructured event 810 by using the displayed regular expression 820. The Value from Sample column 830 corresponds to the Value feature of a token. The Type column 840 corresponds to the Type feature of a token. The Format column 850 indicates the format of a token and is used primarily for tokens of the Type TimeStamp. (If the token is not of Type TimeStamp, then the format is "String".) The Event Field column 860 indicates the field within the normalized schema to which the token is being mapped. As an example, the first row of the table concerns a token whose Value is 10.0.186.192, whose Type is IPAddress, whose format is String, and that is mapped to the sourceAddress field of a normalized event.

A token's Type (as displayed in the Type column 840) is initially determined automatically based on the token's Value, as explained above. However, the user can change the Type if desired. For example, the user can change a Type from Number to String. In order to change the Type, the user clicks on the appropriate table cell (e.g., on the "IPAddress" button). A pop-up menu appears that lists other Types that the user can choose. The existence of the pop-up menu is indicated by the up/down arrows 870 that appear to the right of the Type name (e.g., "IPAddress"). Changing a token Type changes the normalized event that is generated based on an unstructured event. For example, a token value might be placed in a field using one format versus another format.

A token's field mapping (as displayed in the Event Field column 860) is initially determined automatically using the probabilistic mapper 650, as explained above. For example, the token is automatically mapped to the field that has the highest probability. However, the user can change the field mapping if desired. For example, the user can change the field mapping from the most likely field to the second-most likely field. In order to change the field mapping, the user clicks on the appropriate table cell (e.g., on the "sourceAddress" button). A pop-up menu appears that lists other fields in the normalized schema that the user can choose. The existence of the pop-up menu is indicated by the up/down arrows 880 that appear to the right of the Event Field name (e.g., "sourceAddress"). Changing a field mapping changes the normalized event that is generated based on an unstructured event. For example, a token value might be placed in one field versus another field.

The GUI 800 also includes a Recalculate button 890 and a Reset button 895. Pressing the Recalculate button 890 causes the displayed regular expression 820 to be applied to the displayed unstructured event 810. As a result, tokens values are extracted from the displayed unstructured event 810, and token mappings are determined. If the user has edited the displayed regular expression 820, then this edited regex will be applied to the displayed unstructured event 810. This will probably cause some or all of the contents of the table in the third section to change. Pressing the Reset button 895 causes the displayed regular expression 820 to return to the automatically generated regular expression and causes the auto-generated regex to be applied to the displayed unstructured event 810. Again, this will probably cause some or all of the contents of the table in the third section to change.

Note that FIG. 8 shows a GUI for generating a parameter file according to one embodiment of the invention. A GUI for generating a parameter file can contain other widgets/functionalities and/or different numbers of widgets/functionalities than are described in conjunction with FIG. 8. Also, different types of information can be displayed, and the arrangement/formatting of the GUI can differ.

Figure 7:
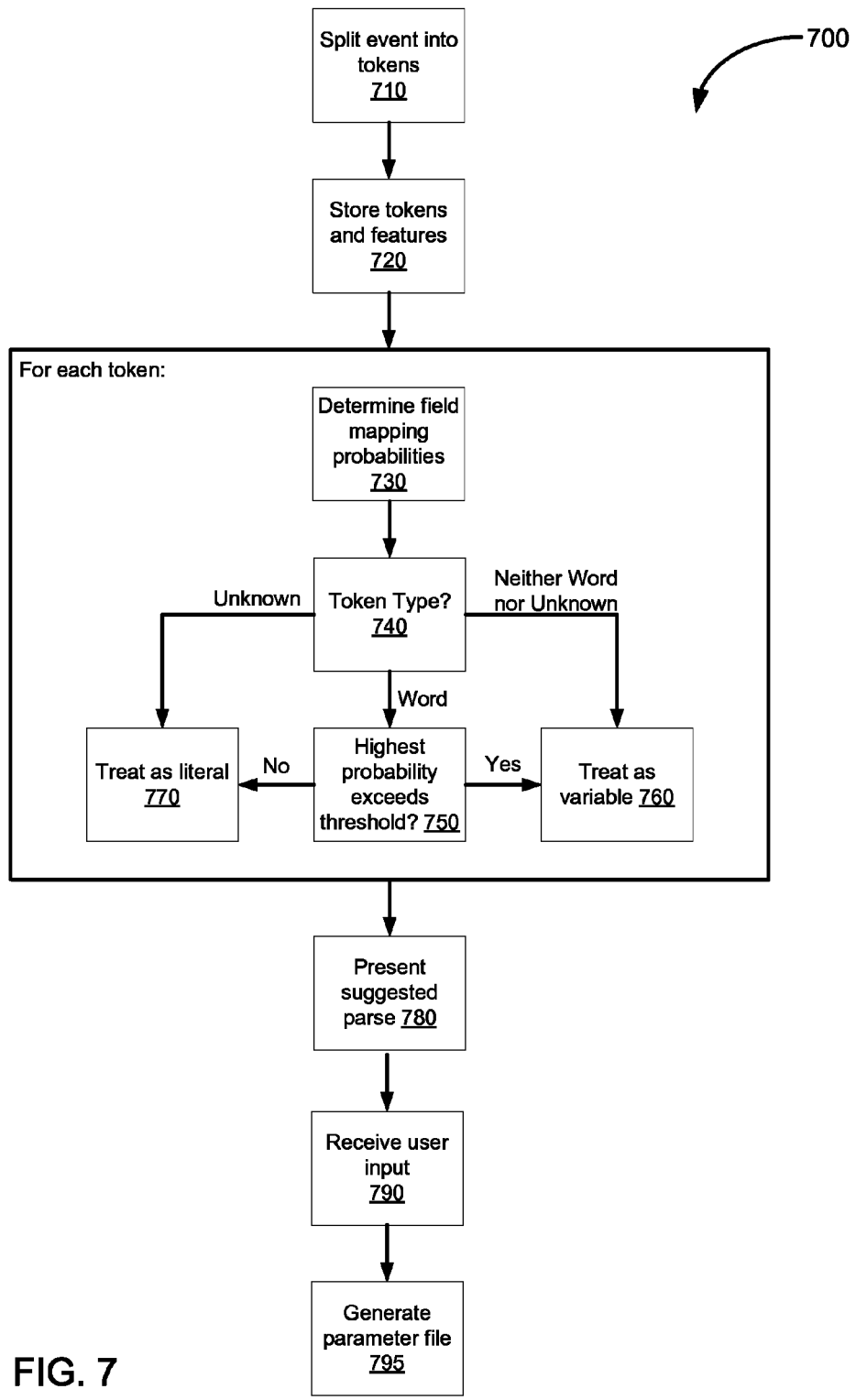
FIG. 7 is a flowchart of a method for generating a parameter file to be used with a parameterized normalized event generator to generate a normalized event based on an unstructured event, according to one embodiment of the invention.

FIG. 7 is a flowchart of a method for generating a parameter file to be used with a parameterized normalized event generator to generate a normalized event based on an unstructured event, according to one embodiment of the invention. When the method 700 begins, an unstructured event is already stored in storage 620 as unstructured event 670. Also, field mapping statistics are stored in storage 620 as field mapping statistics 690, and <Type, regex> pairs are stored in storage 620 as Type regex table 695. Finally, token feature table 660 and parameter file 680 are empty (e.g., null) or initialized (e.g., to zero). When the method 700 finishes, parameter file 680 will contain a regular expression that can extract token values from the unstructured event 670 and token mappings to map the token values to a normalized event.

In step 710, an unstructured event is split into tokens. For example, the control module 630 uses the tokenizer 640 to split the contents of unstructured event 670 into tokens.

In step 720, the tokens and features of the unstructured event are stored. For example, the control module 630 uses the tokenizer 640 to extract the features from unstructured event 670 and store the features and tokens in the token feature table 660.

Next, a series of steps is performed for each token within unstructured event 670. This series includes steps 730 and 740 and might also include steps 750, 760, and/or 770. In step 730, field mapping probabilities are determined. For example, the control module 630 uses the probabilistic mapper 650 to determine one probability for each field of the structured schema, where the one probability represents the likelihood that the token should be mapped to that field. The probabilistic mapper 650 determines the probabilities using the token feature table 660 and the field mapping statistics 690, as explained above. In one embodiment, for each token, the probabilistic mapper 650 returns a list of <field, probability> pairs in descending order of probability.

In step 740, a determination is made regarding the Type of the token. For example, the control module 630 accesses the token's Type within the token feature table 660. If the Type is Unknown, then the method proceeds to step 770, and the token is treated as a literal. The Value of the token is appended 770 to the regex within the parameter file 680.

If the Type is neither Word nor Unknown, then the method proceeds to step 760, and the token is treated as a variable. An appropriate regex is obtained from the Type regex table 695 based on the token's Type. For example, the control module 630 accesses the token's Type within the Type regex table 695 and obtains the associated regex. The appropriate regex is appended to the regex within the parameter file 680. (Since the token value is to be extracted, and not merely matched, the appropriate regex is surrounded by parentheses before appending it to the regex within the parameter file 680.) Suggested field mappings for that token (i.e., within the normalized schema) are stored. For example, the control module 630 stores the list of <field, probability> pairs in descending order of probability that were received from the probabilistic mapper 650. If the Type is Word, then the method proceeds to step 750.

In step 750, a determination is made regarding whether the highest field mapping probability exceeds a threshold. For example, the control module 630 compares the highest field mapping probability to the threshold. If the highest field mapping probability exceeds the threshold, then the method proceeds to step 760, and the token is treated as a variable. An appropriate regex is obtained from the Type regex table 695 based on the token's Type. For example, the control module 630 accesses the token's Type within the Type regex table 695 and obtains the associated regex. The appropriate regex is appended to the regex within the parameter file 680. (Since the token value is to be extracted, and not merely matched, the appropriate regex is surrounded by parentheses before appending it to the regex within the parameter file 680.) Suggested field mappings for that token (i.e., within the normalized schema) are stored. For example, the control module 630 stores the list of <field, probability> pairs in descending order of probability that were received from the probabilistic mapper 650. In one embodiment, only <field, probability> pairs where the probability exceeds a threshold are stored.

If the highest field mapping probability does not exceed the threshold, then the method proceeds to step 770, and the token is treated as a literal. The Value of the token is appended 770 to the regex within the parameter file 680, as explained above.

In one embodiment, a threshold is used for only tokens whose Type is Word. Tokens of other Types (e.g., Number or URL) are automatically treated as variables even if that field mapping probability is lower than the threshold. In one embodiment, the threshold is configurable on a per-event basis. In another embodiment, the threshold is fixed for multiple events, since configuring the threshold per event can be impractical.

At this point, all of the tokens within unstructured event 670 have been processed. Each token has been treated as either a literal or a variable, and the regex within the parameter file 680 has been modified accordingly. Parameter file 680 now contains a regex that extracts token values from unstructured event 670. Also, suggested field mappings have been stored for tokens that were treated as variables.

In step 780, a suggested parse is presented to the user. For example, the control module 630 uses the user interface 655 to display the suggested parse. In one embodiment, a suggested parse comprises a list of possible field mappings for each token that was treated as a variable. The possible field mappings are the suggested field mappings that were stored in step 760.

In step 790, user input is received that selects, from among the displayed possible field mappings, one field mapping for each token that was treated as a variable.

In step 795, the selected token mappings are added to the parameter file 680.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for classifying a token of an unstructured event according to one of a plurality of fields of a structured event schema, comprising:
   calculating, by at least one hardware processor, a probability for each of the plurality of fields of the structured event schema, wherein the calculated probability for each field represents a likelihood that the token is mapped to that field;
   ranking the calculated probabilities for the plurality of fields in a descending order from a highest probability to a lowest probability;
   comparing the highest probability to a threshold; and
   in response to the highest probability exceeding the threshold, mapping the token to one of the plurality of fields having the highest probability.

2. The method of claim 1, further comprising:
   in response to the highest probability being below the threshold, the token is not mapped to any of the plurality of fields.

3. The method of claim 1, further comprising:
   determining a value for each feature within a set of features of the token, wherein the set of features includes a Value feature and a Type feature, and wherein a value of the Type feature is determined based on a value of the Value feature; and
   setting the field of the structured event schema having the highest probability to the determined value.

4. A computer-implemented method for generating a normalized event that adheres to a normalized schema, comprising:
   receiving an unstructured event;
   dividing, by at least one hardware processor, the unstructured event into a plurality of tokens;
   for each token, determining a value for each feature within a set of features, wherein the set of features includes a Value feature and a Type feature, and wherein a value of a token's Type feature is determined based on a value of the token's Value feature; and for each token:

for each field of the normalized schema, determining by the at least one hardware processor a probability that the token maps to the field;

responsive to the token's Type feature having a value other than Unknown or Word:

determining the field of the normalized schema with the highest probability;

mapping the token to the determined field;

determining a value of the determined field based on the value of the token's Value feature; and setting the determined field of a normalized event to the determined value; and responsive to the token's Type feature having a value of Word and responsive to the highest probability exceeding a threshold:

determining the field of the normalized schema with the highest probability;

mapping the token to the determined field;

determining a value of the determined field based on the value of the token's Value feature; and setting the determined field of the normalized event to the determined value.

5. The method of claim 4, wherein the normalized schema comprises Common Event Format (CEF) or Intrusion Detection Message Exchange Format (IDMEF).

6. The method of claim 4, wherein the set of features further includes an Index feature or a Previous Word feature.

7. The method of claim 4, wherein determining the probability that the token maps to the field comprises using a Naïve Bayesian probability model to determine the probability that the token maps to the field.

8. A non-transitory computer readable medium embedded thereon a computer program for generating a normalized event that adheres to a normalized schema, wherein the computer program includes instructions that, when executed by at least one hardware processor, cause the at least one hardware processor to:

receive an unstructured event;

divide the unstructured event into a plurality of tokens;

for each of the plurality of tokens:

for each field of the normalized schema, determine a probability that the token is mapped to the field;

determine a type of the token;

responsive to a determination that the token is a word type, determine whether a highest probability exceeds a threshold;

responsive to the highest probability exceeding the threshold:

determine the field of the normalized schema having the highest probability;

map the token to the determined field;

determine a value of the determined field based on a value of the token; and set the determined field of the normalized event to the determined value.

9. The non-transitory computer readable medium of claim 8, further comprising:

responsive to a determination that the token is an unknown type, the token is not mapped to any field of the normalized schema.

10. The non-transitory computer readable medium of claim 9, further comprising:

responsive to a determination that the token is other than a word type or an unknown type, the instructions cause the at least one hardware processor to:

map the token to the field of the normalized schema having the highest probability, and set the determined field of the normalized event to the determined value.

11. The non-transitory computer readable medium of claim 8, further comprising:

for each of the plurality of tokens, the instructions cause the at least one hardware processor to determine a value for each feature within a set of features, wherein the set of features includes a Value feature and a Type feature, and wherein a value of the Type feature is determined based on a value of the Value feature.

12. A system for generating a normalized event that adheres to a normalized schema, the system comprising:

at least one hardware processor; and a memory to store instructions that, when executed by the at least one hardware processor, cause the at least one hardware processor to:

receive an unstructured event;

divide the unstructured event into a plurality of tokens;

for each of the plurality of tokens:

for each field of the normalized schema, determine a probability that the token is mapped to the field;

determine a type of the token;

responsive to a determination that the token is a word type, determine whether a highest probability exceeds a threshold;

responsive to the highest probability exceeding the threshold:

determine the field of the normalized schema having the highest probability;

map the token to the determined field;

determine a value of the determined field based on a value of the token; and set the determined field of the normalized event to the determined value.

13. The system of claim 12, further comprising:

responsive to a determination that the token is an unknown type, the token is not mapped to any field of the normalized schema.

14. The system of claim 13, further comprising:

responsive to a determination that the token is other than a word type or an unknown type, the instructions cause the at least one hardware processor to:

map the token to the field of the normalized schema having the highest probability, and set the determined field of the normalized event to the determined value.

15. The system of claim 12, further comprising:

for each of the plurality of tokens, the instructions cause the at least one hardware processor to determine a value for each feature within a set of features of the token, wherein the set of features includes a Value feature and a Type feature, and wherein a value of the Type feature is determined based on a value of the Value feature.

* * * * *